United States Patent [19]

Chryst

[11] 4,422,581
[45] Dec. 27, 1983

[54] APPARATUS FOR RECOVERING RUBBER FROM RUBBER TIRES

[76] Inventor: Milton R. Chryst, 7025-125th Ave. SE., Snohomish, Wash. 98290

[21] Appl. No.: 225,434

[22] Filed: Jan. 15, 1981

[51] Int. Cl.³ .............................................. B02C 18/06
[52] U.S. Cl. ............................................ 241/66; 82/54; 82/57; 83/430; 83/923; 157/13; 209/672; 241/73; 241/101.4; 241/225; 241/DIG. 31
[58] Field of Search .................. 209/672, 670, 932; 157/13; 83/923, 187, 411 R, 425, 430, 500, 439; 241/60, 66, 73, 222, 223, 224, 225, 241, 294, 300.1, 79.1, 19, 75, 101.2, 101.4, DIG. 31; 82/54, 57, 58

[56] References Cited

U.S. PATENT DOCUMENTS

| | | | |
|---|---|---|---|
| 1,320,968 | 11/1919 | Baudendistel | 241/79.1 X |
| 2,225,797 | 12/1940 | Plauson | 241/66 X |
| 2,298,685 | 10/1942 | Davis | 157/13 X |
| 2,890,840 | 6/1959 | Fletcher et al. | 241/73 |
| 3,004,721 | 10/1961 | Notzold | 241/79.1 X |
| 3,701,296 | 10/1972 | Snow | 82/58 X |
| 3,708,129 | 1/1973 | Nowak | 241/222 X |
| 3,827,642 | 8/1974 | Sageman | 241/222 X |
| 3,897,016 | 7/1975 | Shah | 241/224 X |
| 3,974,970 | 8/1976 | Bertrand et al. | 241/222 |
| 4,015,782 | 4/1977 | Granite | 241/222 X |
| 4,061,284 | 12/1977 | Raisbeck et al. | 241/222 X |
| 4,238,980 | 12/1980 | Frame | 82/54 |

FOREIGN PATENT DOCUMENTS 65050  7/1942  Norway ............................. 209/672

*Primary Examiner*—Mark Rosenbaum
*Attorney, Agent, or Firm*—Cole, Jensen & Puntigam

[57] ABSTRACT

One aspect of the invention is a tire debeading machine (10). A tire is supported on a guide apparatus (15) and raised to an operative position by the action of a support arm (21). A cutting blade (33) is moved against the sidewall of the tire, cutting off the bead. After the initial cut is made, the tire is raised slightly further by the combined action of an initially interlocking vertical arm (75), which extends from said support arm (21), and a roller (71) on an L-shaped arm (69). The further cut by blade (33) is closer to the bead. Another aspect of the invention is a granulating machine which includes three feed rollers (93) (95) (97) which feed the debeaded tires into a cylindrical cutting chamber (106). Inside the cutting chamber (106) are a plurality of rotary cutting blades (127) mounted on mounting plates (130), which cooperate with stationary cutting blades to produce granulated rubber particles and fiber particles. A further aspect of the invention is a separator (180) which includes two separating apparatuses (184) (189), each of which comprise a plurality of sets of revolving plates (185). A flow of air is directed upwardly through the two separating apparatuses, through a rear airflow channel (198) and then out of the separator. The rubber particles drop down through both separating apparatuses and out of the bottom of the machine, while the lighter fiber particles are moved upwardly with the airflow and out the rear of the separator.

43 Claims, 12 Drawing Figures

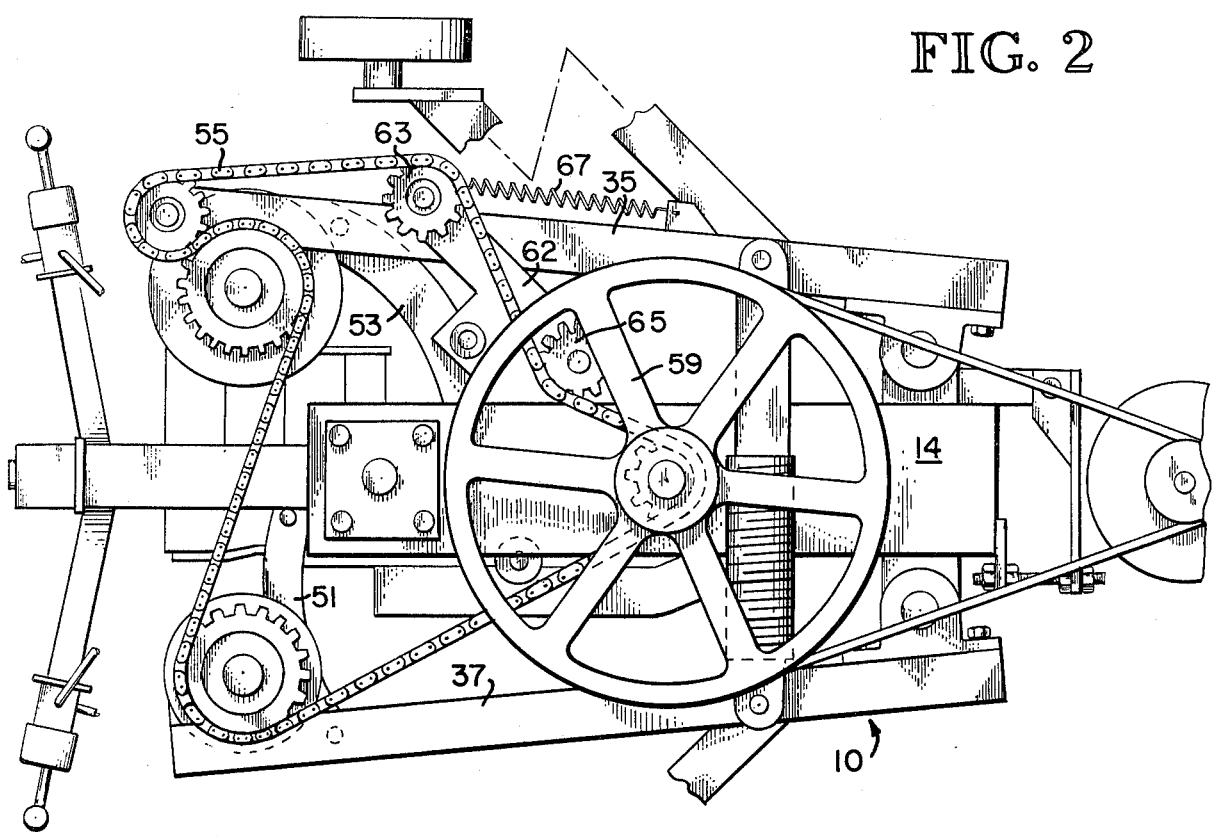
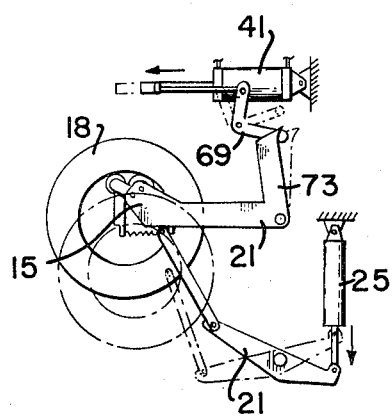
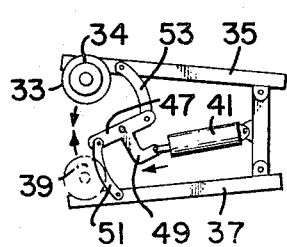
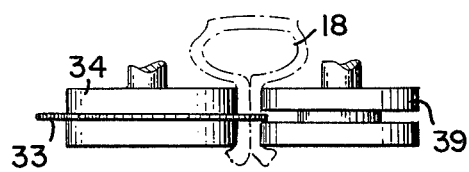

APPARATUS FOR RECOVERING RUBBER FROM RUBBER TIRES

DESCRIPTION

1. Technical Field

The invention relates generally to the art of recovering rubber from rubber tires and other rubber articles and more particularly concerns a machine for removing the bead from tires, a machine for granulating the debeaded tires, and a machine for separating fibrous material, such as cord fibers, from rubber particles.

2. Background Art

Machines for grinding rubber tires into rubber particles are known and are commercially available, but such machines are known to have numerous disadvantages, which make their use impractical in most circumstances. The debeading operation, in which the metal bead around the inner periphery of the tire is removed, is usually quite slow, with each bead being cut off separately, and inefficient since it has been heretofore difficult to remove the bead without either hitting the bead or cutting off excess rubber. Granulating the tires is also quite inefficient with known machines; they are not capable of high production operation over extended periods of time, which makes the recovery of rubber from old tires economical. Further, the product of the grinding operation includes fiber particles from the cord along with the rubber particles, which is undesirable. However, it is expensive and time consuming to separate the particles.

Accordingly, it is a general object of the present invention to provide an apparatus for recovering rubber from rubber tires or similar rubber-containing elements which overcomes one or more of the disadvantages of the prior art noted above.

It is another object of the present invention to provide such an apparatus which rapidly and efficiently removes the metal beads from tires.

It is a further object of the present invention to provide such an apparatus which cuts the bead from the tire without striking the bead or removing excess rubber along with the bead.

It is a still further object of the present invention to provide such an apparatus which granulates rubber tires and similar articles more efficiently than similar prior art machines.

It is an additional object of the present invention to provide such an apparatus which is capable of substantially continuous operation over a relatively long period of time.

It is yet another object of the present invention to provide such an apparatus which is capable of processing a relatively large quantity of input material in a given amount of time.

It is a still further object of the present invention to provide such an apparatus which is capable of reliably and conveniently separating fabric particles from rubber particles.

DISCLOSURE OF THE INVENTION

Accordingly, one aspect of the invention is a debeading machine, which includes means for supporting a tire, and means for moving the supporting means, with the tire thereon, to a first operative position. Means are provided for cutting through at least one sidewall of the tire, as well as means for moving the cutting means into position so that it cuts through a sidewall of the tire after the tire is in said first operative position. Further, the debeading machine includes means responsive to the operation of the cutter moving means for moving the tire a slight additional distance beyond, i.e. above, the first operative position, following the initial cut through the sidewall of the tire by the cutter. The further operation of the cutting means thus results in the cut being closer to the bead then the initial cut.

A second aspect of the invention is a machine for granulating rubber from a rubber-containing product of some kind, such as a tire. The apparatus includes means for feeding the rubber-containing material into the apparatus and a cutting chamber means in the apparatus, the cutting chamber means including at least three stationary cutting blade stations which are located around the circumference of the cutting chamber, and at least one plurality of rotary cutting blades which are mounted so that they rotate within the cutting chamber means. One stationary cutting blade station is located approximately at the bottom center of the cutting chamber, with screens being positioned between the bottom stationary cutting blade station and the lower edges of the other two stationary cutting blade stations. In operation, the rotary cutting blades pass by the stationary cutting blade stations in a cutting relationship with the stationary cutting blades therein. The apparatus further includes means for rotating the rotary cutting blades within the cutting chamber.

A third aspect of the invention is an apparatus which separates fibrous or other relatively lightweight particles from rubber or other relatively heavier particles. The apparatus includes an enclosure means which has defined therein a first opening generally near the top thereof for input of the combined fibrous and rubber particles. A first separating means which comprises a plurality of interleaved sets of revolving plates is positioned beneath the first opening, while a second plurality of interleaved sets of revolving plates is positioned beneath the first set. Baffles are positioned within the enclosure to form a first funnel-like region between the bottom of said first separating means and the top of the second separating means and a second funnel-like region between the bottom of said second separating means and a first exit opening near the bottom of the apparatus. An airflow channel is formed at the rear of the enclosure, substantially for the full height of the apparatus, terminating in a second exit opening. Means are also provided to draw air up through the first exit opening, through the two funnel-like regions, the two separating means, and then through the airflow channel and out of the second exit opening. In operation, the rubber particles are separated from the fiber particles by the two separating means, with the rubber particles falling through the machine and exiting out the first exit opening, while the fibrous particles are moved upwardly by the airflow, through the airflow channel and out the second exit opening.

BRIEF DESCRIPTION OF THE DRAWINGS

FIG. 2 is a plan view of the debeading machine of FIG. 1.

FIG. 3 is a side elevation view of a portion of the debeading machine of FIG. 1, showing the movement of the machine with a tire to an operative position.

FIG. 4 is a plan view of another portion of the debeading machine of FIG. 1, showing the apparatus for moving the cutting blade into operative position.

FIG. 5 is a side elevation view of the cutting blade portion of the debeading machine of FIG. 1, shown in operative position relative to a tire.

BEST MODE FOR CARRYING OUT THE INVENTION

Figure 1:
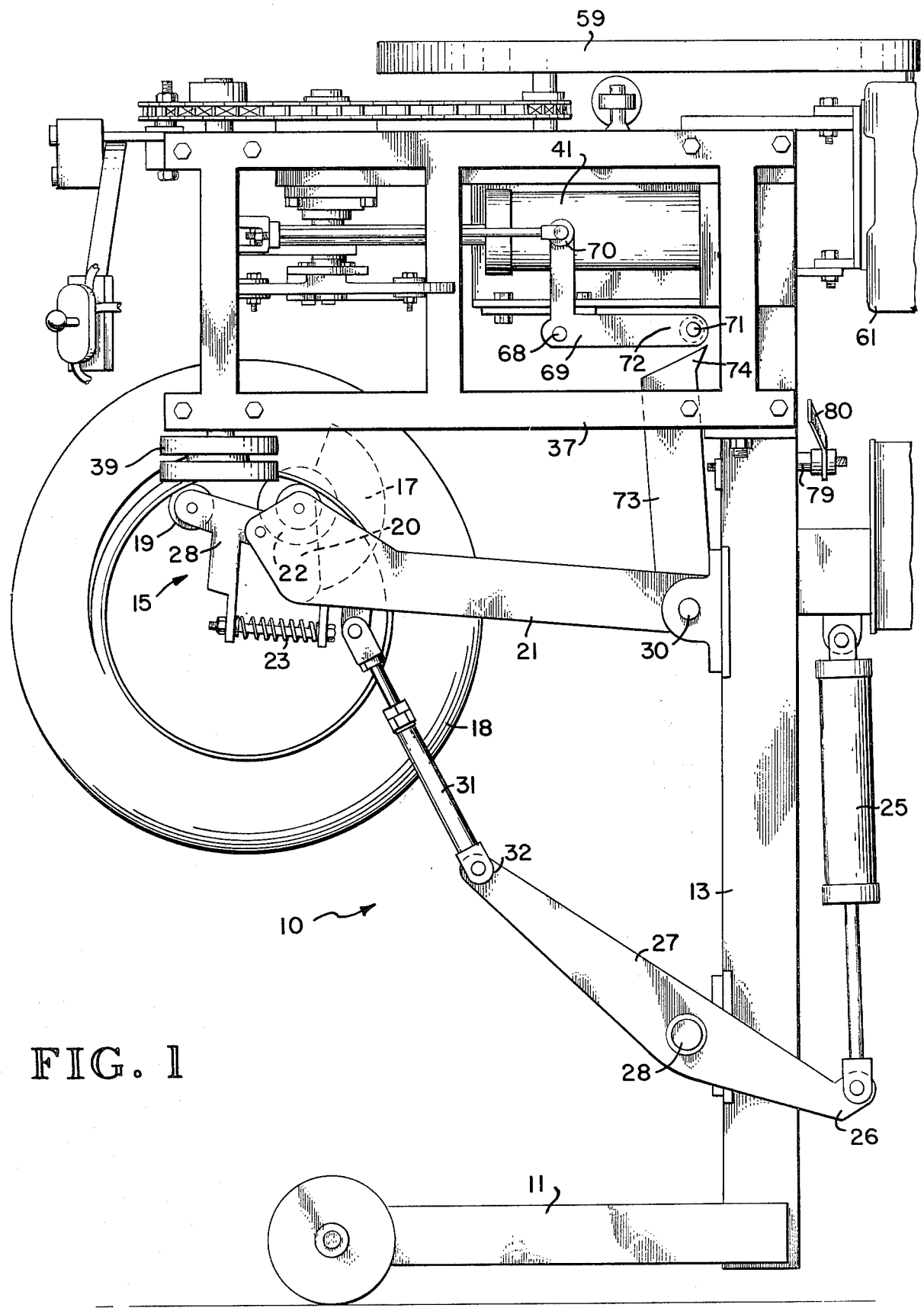
FIG. 1 is a side elevation view of the debeading machine.

FIGS. 1-5 show the debeading machine, which is referred to generally at 10. The debeading machine includes generally a frame which in turn includes a horizontal base 11, a vertical post 13, and an upper horizontal support element 14. A tire 18 to be debeaded is initially positioned on a guide apparatus shown generally at 15, which supports tire 18. Guide apparatus 15 includes an arcuate shaped plate 17, approximately 3/16 inches wide in the embodiment shown, which fits into the tire cavity between the sidewalls of the tire. One end of arcuate plate 17 is connected to a small mounting plate 20, to which are connected two horizontal cross bolts (not shown) which connect mounting plate 20 to a support arm 21, which in turn is pivotally connected to the post 13. Arcuate plate 17 is between mounting plate 20 and support arm 21.

A first roller 22 rides on one cross bolt, with the inner edge of plate 17 being close to the outer surface of roller 22. A second roller 19 is mounted on a small arm 28 which is rotatably connected to the other cross bolt; a spring 23, connected between small arm 28 and support arm 21, tends to bias roller 19 against the edge of the bead of the tire, as shown most clearly in FIGS. 1 and 3.

Support arm 21 is moved about its pivot point 30 on post 13 by the action of an air cylinder 25 which moves one end 26 of a lower pivoting arm 27 about a pivot point 28a, also on post 13 but substantially below pivot point 30. The other end 32 of pivoting arm 27 moves in the opposite direction as the one end 26. A connecting arm 31 extends between the other end 32 of pivoting arm 27 and support arm 21, so that a movement of pivoting arm 27, by air cylinder 25 for instance, results in a corresponding movement of support arm 21.

Thus, when air cylinder 25 is activated by the operator, the one end 26 of pivoting arm 27 moves downwardly and the other end 32 moves upwardly, with connecting arm 31 forcing support arm 21 to pivot upwardly about pivot point 30, moving the guide apparatus 15, with the tire positioned thereon, upwardly. The uppermost position of guide apparatus 15 is the first operative position of the machine for debeading.

In the first operative position of the debeading machine 10, with a tire in position on guide apparatus 15, a horizontal bead cutter blade 33, in a cutter mount 34, is positioned against one sidewall of the tire a small distance above the edge of the tire bead. The mount 34 is positioned on a first horizontal cutter blade arm 35 which is horizontally rotatably connected to vertical post 13. A second horizontal cutter blade arm 37 is horizontally rotatably connected to post 13 in substantially the same plane as cutter blade arm 35, but the two blade arms 35 and 37 extend to the opposite sides of the tire. At the end of blade arm 37 is a cutting blade block 39 with which blade 33 mates, so that when blade arms 35 and 37 are rotated towards each other under force, blade 33 and blade block 39 mate together, with blade 33 slicing through both sidewalls of the tire, removing both beads of the tire simultaneously, as shown most clearly in FIG. 5.

A second air cylinder 41 controls the rotational movement of blade arms 35 and 37. FIG. 4 shows this structure most clearly. A support rod extends vertically downward a short distance from upper support element 14, approximately 20 inches out from post 13. Rotatably connected to the support rod is a horizontal lever 47, which is approximately 10 inches long. A connecting lever 49 connects air cylinder 41 with horizontal lever 47, so that when air cylinder 41 is activated, connecting lever 49 acts on lever 47, rotating it in one direction. When air cylinder 41 is deactivated, lever 47 rotates in the other direction. Arcuate shaped lever arms 51 and 53, respectively, are rotatably connected to the respective ends of horizontal lever 47 and blade arms 33 and 37, so that when air cylinder 41 is activated, rotating horizontal lever 47 in a clockwise direction (viewed from above), lever arms 51 and 53 tend to move in a clockwise direction, pulling blade arms 35 and 37 together, and forcing cutting blade 33 through the sidewalls of the tire to mate with cutting block 39.

Cutting blade 33 and cutting block 39 are rotated at approximately 140 rpm in the embodiment shown to cut the sidewall of the tire. This is accomplished by means of a chain drive 55 operating in cooperation with sprocket gears on blade mount 34 and the blade block 39. The chain drive is activated by a belt-driven drive wheel 59, from a motor 61. Two takeup sprockets 63 and 65 also form a part of the chain drive, mounted on a rotatable T-shaped bracket 62. The takeup sprockets are biased by a spring 67, so that proper tension is maintained continuously on the chain drive.

Also operating off the second air cylinder 41 is an L-shaped arm 69 (FIGS. 1 and 3), which is mounted to rotate in a vertical plane about a point 68 where the two portions of arm 69 meet. One end 70 of L-shaped arm 69 is driven by air cylinder 41 and moves substantially horizontally therewith, while the other end 72, which includes a roller 71, moves substantially vertically. When air cylinder 41 is not activated, so that cutting blade 33 is not in a cutting position, the top hook-like portion 74 of a vertical arm 73, which is connected at its base to horizontal support arm 21 at pivot point 30, mates against roller 71 (FIG. 3), preventing further rearward movement of the upper end of arm 73, and hence further vertical movement of the forward end of arm 21 and the mounted tire. Thus, the vertical arm 73, in combination with roller 71, acts as an initial stop for the vertical movement of the tire and determines the first operating position of the machine.

However, when air cylinder 41 is activated so that cutting blade 33 has made its initial cut through the tire, the air cylinder also causes the one end 70 of L-shaped arm 69 to move sufficiently horizontally that the other end 72, with roller 71, moves sufficiently vertically that roller 71 now rises above the upper end of vertical arm 73, resulting in the vertical arm 73 moving slightly more rearwardly, with a corresponding small additional upward movement of support arm 21 and tire 18, moving the cutting blade 33 closer to the bead of the tire.

This action has a beneficial result, in that the initial cut of the blade into the tire is always sufficiently above the bead so that the blade 33 never comes into contact with the bead, unlike many conventional debeading machines. The slight additional upward movement of the tire, resulting from the arrangement described above, results in the further cut of the blade 33 to be closer to the bead, thus reducing loss of rubber to a minimum. The amount of the additional upward movement of the tire 18 is determined by the amount of additional rearward movement of vertical arm 73, which is determined by a stop 79 which extends through vertical post 13 to contact vertical arm 73. Stop 79 in the embodiment shown is on an eccentric, so that rotation of handle 80 will result in a change in the length of the stop 79 protruding through post 13 and hence the amount of additional rearward movement permitted to vertical arm 73.

The rotation of cutting blade 33, at approximately 140 RPM in the embodiment shown, rotates the tire 18 on guide apparatus 15 as it cuts the beads. After the beads are completely cut off, the air cylinders 25 and 41 are deactivated by the operator, resulting in blade arms 35 and 37 swinging away from the sides of the tire, and arm 21 pivoting downwardly, permitting the now debeaded tire to be conveniently removed from guide apparatus 15. The debeaded tire is then fed to the granulator, which grinds the debeaded tire into small particles.

The granulating machine, shown in FIGS. 6–9, is referred to generally at 90. At the top of granulating machine 90 is a feed hopper 91. Feed hopper 91 is large enough to accommodate one or more debeaded tires, and extends for approximately the full width of the granulating machine, which in the embodiment shown is slightly greater than 40 inches. At the bottom of feed hopper 91 are three horizontal feed rollers 93, 95 and 97, each of which also extends substantially the full width of the machine. Each feed roller comprises a horizontal rod on which are mounted star-shaped feed plates at spaced intervals. Feed roller 93 is set above rollers 95 and 97, which are in the same plane. The centers of rollers 95 and 97 are approximately 7 inches apart in the embodiment shown; roller 93 is approximately 12 inches above the plane of rollers 95 and 97, with rollers 95 and 97 being on opposite sides of an imaginary vertical plane through the longitudinal center of roller 93.

The star-shaped plates on roller 93 are 8 inches in outside diameter and are set at 6 inch intervals while the star-shaped plates on roller 95 are 6 inches in outside diameter and are set at 4 inch intervals, and the star-shaped plates on roller 97 are 7 inches in diameter and set at 4 inch intervals. The end star-shaped plates on roller 93 are set approximately 6 inches in from the ends of the roller, while the end plates on rollers 95 and 97 are set approximately 5 inches and 3 inches, respectively, in from the roller ends. The star-shaped plates on rollers 93, 95 and 97 are positioned, respectively, so that they form an interleaving pattern, as shown most clearly in FIG. 8.

Figure 7:
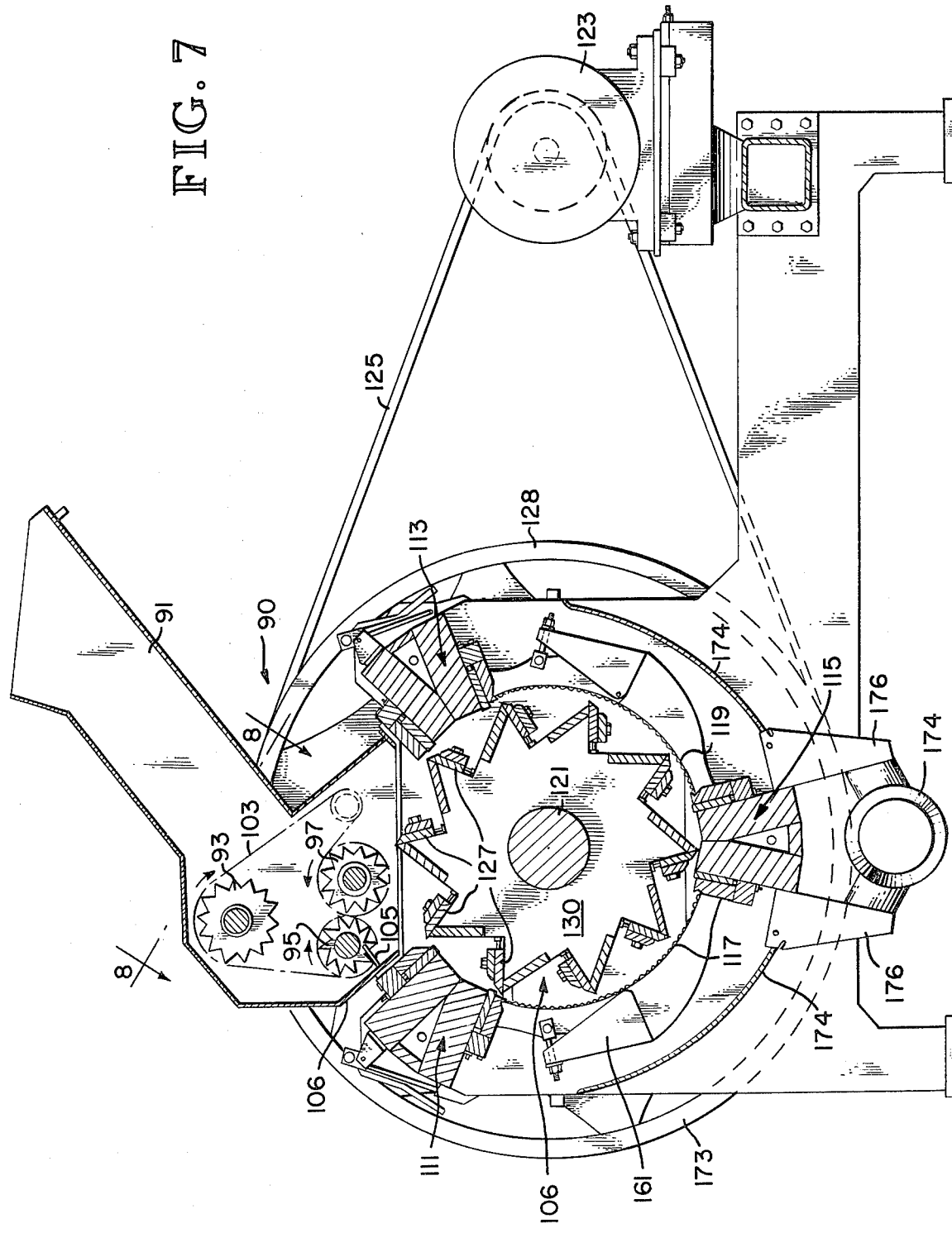
FIG. 7 is a vertical cross-section view of the granulating machine of FIG. 6.

Roller 97 is positively powered by means of a motor 99, through a belt 101 and a pulley on the roller. The three rollers are connected together at the other end of the machine by a chain 103 and sprockets on each of the rollers. Thus, as roller 97 is driven positively by motor 99, rollers 93 and 95 also rotate. As seen in FIG. 7, the counterclockwise rotation of roller 97 by motor 99 results in the clockwise rotation of both rollers 93 and 95. Thus, the two lower feed rollers 95 and 97 rotate toward each other.

A back plate 105 is mounted perpendicularly to a rear wall 106a of feed hopper 91 and extends the full width of the machine. It extends outwardly from wall 106a to roller 95, and has a plurality of grooves along its length which permit the passage of the star-shaped plates on roller 95. Back plate 105 extends substantially to the center rod of rollers 95, so that there is virtually no open space between roller 95 and wall 106a of feed hopper 91, and thereby prevents any rubber particles in the granulating machine being moved upwardly between roller 95 and wall 106a of the feed hopper by the clockwise rotation of roller 95.

A debeaded tire fed into feed hopper 91 will move down the hopper by gravity and will initially contact upper roller 93, which tends to force the tire down and between lower rollers 95 and 97. The tire is then squeezed between rollers 95 and 97 and exits beneath the two rollers at a relatively uniform rate into the cutting chamber, shown generally at 106, which is the central portion of granulating machine 90. The feed rate of the tires into cutting chamber 106 depends on the rate of rotation of the feed rollers. This rate can of course be varied, but a rate of 30 RPM has been found to provide acceptable feeding results.

Figure 6:
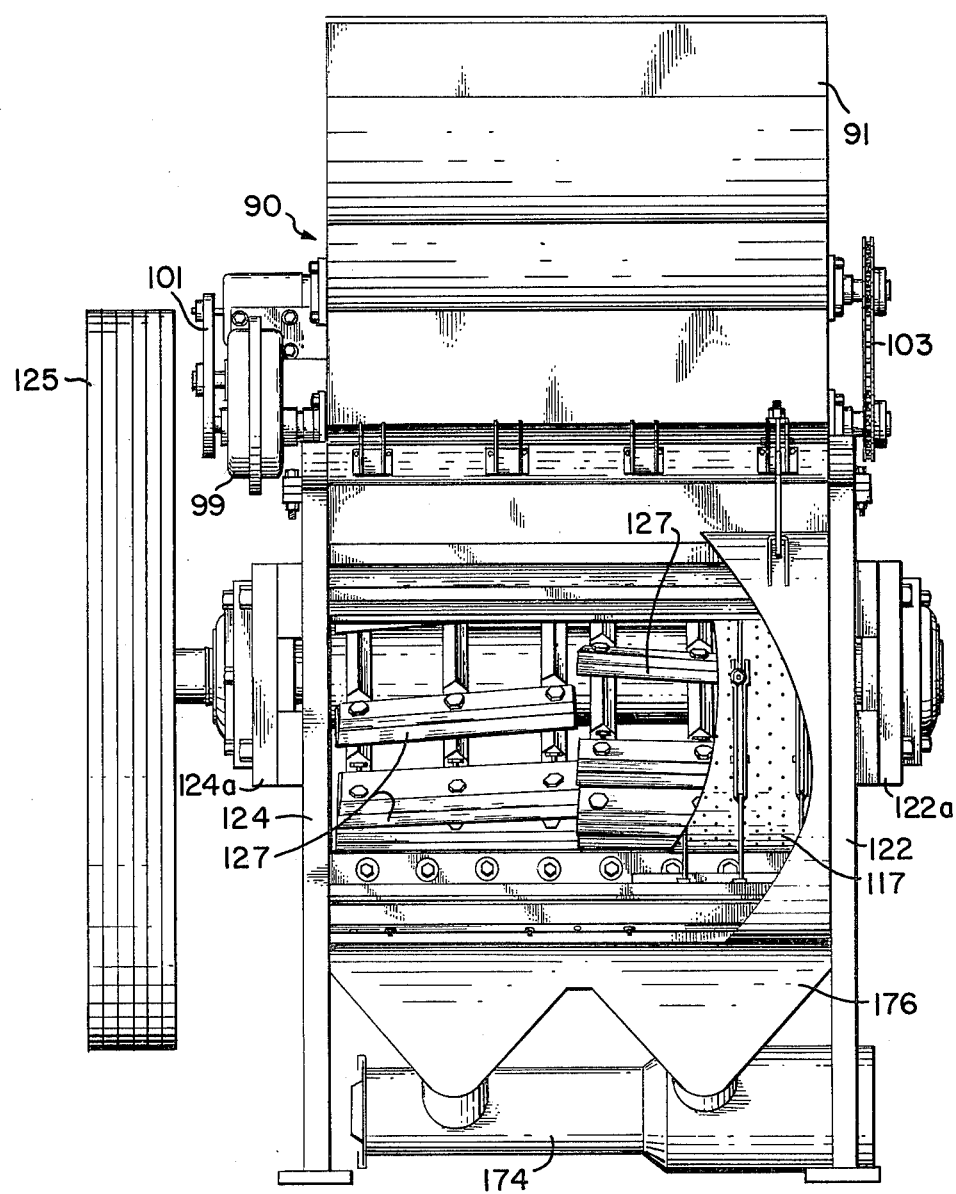
FIG. 6 is a side elevation, partially cutaway, view showing the granulating machine.
Figure 9:
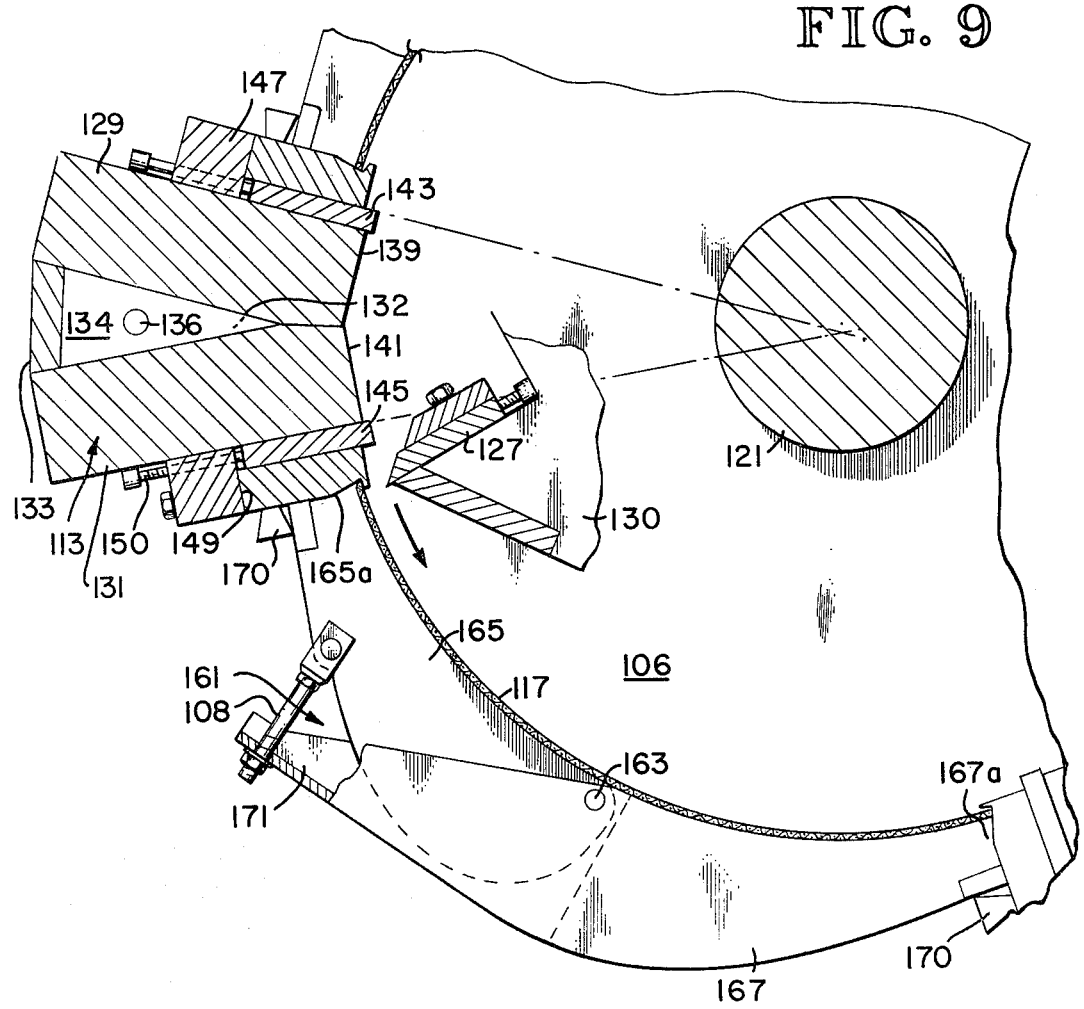
FIG. 9 is a partial vertical cross-section view of the granulating machine of FIG. 6, showing a single stationary cutting head with cutting blades, a single rotary cutting blade in relationship thereto, and the screen structure.

FIGS. 6, 7 and 9 show the cutting chamber 106, which in the embodiment shown is circular in cross-section, approximately 30 inches in diameter, and which extends the full width of the machine. The top of the cutting chamber 106 is open, and communicates with feed hopper 91 so that tires passing through feed rollers 95 and 97 enter the cutting chamber 106 immediately. On either side of the opening at the top of the cutting chamber are two upper stationary cutting heads 111 and 113. A third, lower stationary cutting head 115 is located at the bottom of the cutting chamber. The stationary cutting heads 111, 113 and 115 extend for the full length of the cutting chamber 106, and each contain stationary cutting blades. Connecting the lower edge of upper stationary cutting heads 111 and 113, respectively, with the respective opposite edges of lower stationary head 115 are two screens, 117 and 119, which, in combination with the stationary cutting head structure, define the boundary of the cutting chamber. Screens 117 and 119 will be discussed in more detail in the following paragraphs.

A horizontal drive rod 121 extends the full width of the machine, through the center of cutting chamber 106. The horizontal drive rod 121 is supported by the end walls 122, 124 of the machine and the bearing structures 112a and 124a located therein. Drive rod 121 is driven by a large capacity motor 123 acting through a belt 125 and pulley structure 128 at one side of the machine. In the embodiment shown, the motor is 200 HP.

Positioned at spaced intervals along drive rod 121 are a plurality of substantially star-shaped mounting plates 130. Mounted on the edges of the star-shaped plates, and extending laterally between successive mounting plates, are a plurality of rotary cutting blades 127, which are positioned so that their sharp cutting edges define an imaginary cylindrical surface at the periphery of the cutting chamber 106 as they are rotated. In this position, the rotary cutting blades 127 are capable of mating with the stationary cutting blades in the stationary cutting heads 111, 113 and 115 in a proper cutting relationship.

In operation, the rotation of drive rod 121 by motor 123 will in turn rotate the mounting plates 130, and the rotary cutting blades mounted thereon will pass by each of the stationary cutting blades in the stationary cutting heads in turn, grinding the incoming tires into the desired size particles.

Referring now to FIG. 9, the configuration of the stationary cutting heads, such as 113, is shown in more detail. The structure of the other stationary cutting heads 115 and 117 is substantially identical to that of 113 shown in FIG. 9. Each stationary cutting head includes two blocks of material 129 and 131, which extend for the full length of the cutting chamber 106. In the embodiment shown, these blocks are made of mild steel, and are approximately 41 inches long by 10 inches wide by 3½ inches thick. They are angled relative to each other, 25° in the embodiment shown, so that a V-shaped void 132 exists between them. The angle of the two blocks is outwardly from the periphery of the cutting chamber, where they are joined together by welding or the like along their lengths.

A back plate 133 extends between the two blocks 129 and 131, closing off the otherwise open end of the void 132, for the length of the stationary cutting head.

An end plate 134 is provided at both ends of the stationary cutting head, to completely close off the void 132 defined between blocks 129 and 131 and back plate 133. The end plates may have tap openings therein 136 to permit water to be moved through void 132, for cooling of the stationary cutting heads. The inner ends 139 and 141, adjacent the cutting chamber, of the respective blocks 129 and 131 are flat, with an angle of approximately 155° between them. Stationary cutting blades 143 and 145 are positioned against the outer sides of the respective blocks 129 and 131 by clamps 147 and 149. The clamps are secured to their respective blocks 129 and 131 by conventional means, such as bolts. A bolt 150 or screw is tapped through the clamp into the stationary cutting blade. By turning bolt 150, the position of the blade relative to the clamp and hence the stationary cutting head may be precisely controlled. The cutting edge of the stationary cutting blades extends a small distance beyond the respective inner ends 139, 141 of the blocks into the cutting chamber 106.

In the embodiment shown, referring now again to the rotary cutter blades, there are a total of six mounting plates 130 on the drive rod 121, positioned at spaced intervals of approximately 8 inches. Each of the mounting plates 130 is made of mild steel approximately 2 inches thick. The mounting plates are securely affixed to the horizontal drive rod 121 by means of welding or the like. Each of the mounting plates has a generally star-shaped outline, permitting mounting of the rotary cutting blades on the edges of the mounting plates so that they extend between successive mounting plates, along the length of cutting chamber 106. The rotary cutting blades are secured to the mounting plates such that the sharp edge of the cutting blade extends outwardly from the mounting plates, to mate with the sharp edge of the stationary cutting blades as the mounting plates are rotated.

In the embodiment shown, there are a total of six mounting plates 130, divided into two successive groups of three mounting plates each. Each group serves as mounts for one set of cutting blades. Thus, a first set of rotary cutting blades are each approximately 20 inches long, and mounted on the first group of mounting plates, while the second set of rotary cutting blades are similarly mounted on the second group of mounting plates. In the embodiment shown, there are ten rotary cutting blades in each set, so that successive rotary blades are separated by an angle of 36° around the periphery of the mounting plates; the number and spacing of the rotary cutting blades can be of course varied.

The rotary cutting blades are mounted against the edges of the mounting plates by means of conventional clamping blocks and bolts. They are mounted to angle in the longitudinal direction, i.e. one end of each blade is offset from the other, so that the granulated particles of rubber tend to move toward the center of the cutting chamber in operation of the machine instead of toward the ends. In operation, the outer end of the cutting edge of a rotary blade will contact the cutting edge of the stationary cutting blade first, with the rate of contact between each successive point along the cutting edge of the rotary blade and the stationary cutting blade being dependent on the value of the angle of the rotary cutting blade.

In the embodiment shown, the angle is approximately 5°; e.g. one inch of offset for each 12 inches of length, although the angle can be varied. Both sets of rotary blades are angled so that the outer end of the rotary blades makes first contact with the stationary cutting blades. This angling may be accomplished by various means, such as spacers on the edge of the mounting plates or by configuring the outline of each mounting plate slightly differently. Thus, the rubber particles tend to move toward the driving rod in operation of the machine. Furthermore, the rotary cutting blades in one set are slightly offset from the rotary blades in the other set, so that the respective inner ends of the cutting blades in the two sets, which terminate near the longitudinal center of the machine, do not abut, but are spaced apart from each other slightly in a rotational direction, i.e. around the circumference of the cutting chamber.

The two upper stationary cutting heads 111 and 113 in the embodiment shown are separated by an angle of approximately 106°; the lower stationary cutting head 115 is separated from upper cutting head 111 by an angle of 127°, leaving 127° between the other stationary cutting head 113 and lower stationary cutting head 115. This particular arrangement in combination with the arrangement of the rotary cutting blades described above, insures that no more than one rotary cutting blade in a given one of the two sets of rotary cutting blades is in contact with a stationary cutting blade at any one time. Such an arrangement significantly reduces the vibration of the machine in operation and adds to the durability and long life of the apparatus.

The rotation of horizontal drive rod 121 causes the cutting edges of the rotary cutting blades to pass by the cutting edges of the stationary cutting blades. In the embodiment shown, the smallest distance between a rotary and a stationary blade, as they pass each other, is 0.012 inches. The debeaded rubber tires are ground between the rotary and stationary cutting blades. In the embodiment shown, the rotary cutting blades move at approximately 200 RPM. This results in the rubber tire input being rapidly reduced to relatively fine particles. In the first pass of the input through the granulating machine 90, the size of the resulting rubber particles is approximately 3/16th inch. Smaller size particles require additional passes of the material through the machine.

As the rubber tire input is ground by the machine, the resulting particles fall down onto and through arcuate shaped screens 117 and 119 which extend the full length of the cutting chamber between the respective longitudinal edges of lower stationary cutting head 115 and the lower edges, respectively, of the other cutting heads 111 and 113.

The screens 117 and 119 which are shown partially in FIGS. 6, 7 and 9 are made of sheet metal, perforated by openings of desired size and spacing. Different mesh-sized screens may be provided so that the machine produces the desired size granules. To produce 3/16th inch particles with fines, a 3/16th perforated screen is used. The screens 117 and 119 extend for the full width of the machine, i.e. for the full length of the cutting chamber, and are held in place by a plurality of screen holders. The top and bottom edges of the screens fit into and against a small mating lip along the edges of the stationary cutting heads 111, 113 and 115. The edges of the screen are initially positioned against the mating lips in the stationary cutting heads; the screen holders, shown generally at 160, then are used to urge the edges of the screen tightly into position against the lip on the cutting heads, and to hold the screen in that position.

Figure 8:
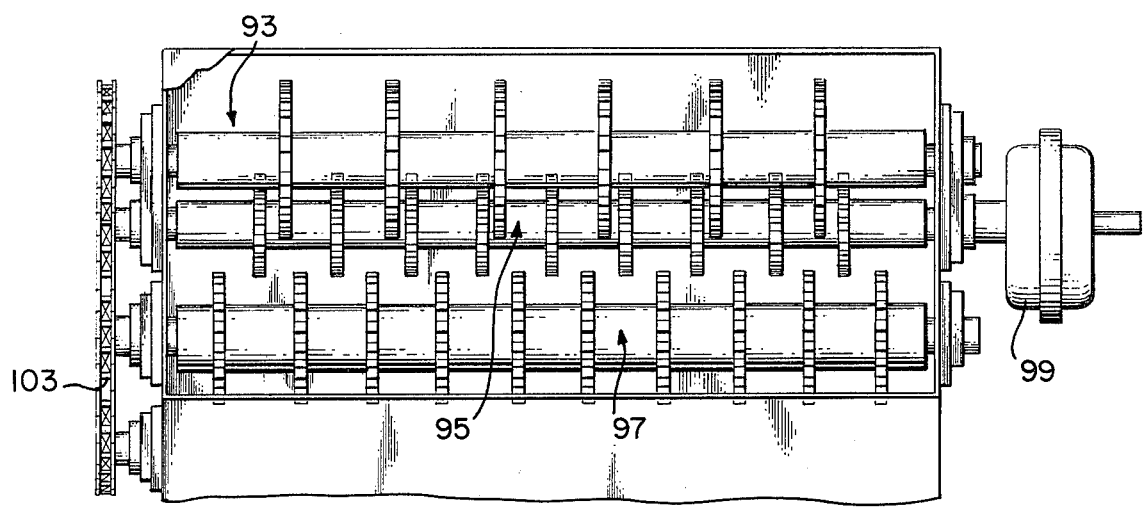
FIG. 8 is a cross-section view of a portion of the granulating machine of FIG. 7, taken along lines 8—8 thereof, showing the relationship of the three feed rollers in the bottom of the feed hopper.

FIGS. 7 and 8 show the screen holder mechanism in detail. There is one set of screen holders for each screen, with each set of screen holders comprising several individual screen holders 161 connected by a small rod 163. Each screen holder plate comprises two arcuate sections 165, 167 which pivot together about rod 163. The free ends 165a and 167a of each screen holder plate fit against stops 170 on the stationary cutting heads. The screen holder plate 161 extends around an angle of approximately 90°. One end 171 of the lower section 167 of the screen holder plate extends outwardly from the outer edge of the upper section 165.

A bolt 168 is pivotally attached to the outer edge of section 165. The free end of bolt 168 fits into a slot in the one end 171 of section 167, and extends slightly outwardly therebeyond. As a nut is tightened onto bolt 168, the one end 171 tends to be drawn toward the outer edge of section 165, so that the two sections 165 and 167 pivot relative to each other about rod 163, decreasing the curve of the inner edge of the screen holder plate. Thus, when the screen holder plates are placed in position against a screen and the respective sections of each screen holder plate pivoted as described above, the screen is flattened out, with the edges of the screen being pressed firmly into and against the retaining lips at the edges of the stationary cutting blocks.

The screen is held in this configuration, braced against the inner edge of the screen holder plates and the retaining lips on the stationary cutting heads, because the screen holder plates are locked into position. When the screen holder plates are released by loosening the nut/bolt combinations, the tension on the screen is released and the screen may be conveniently removed, for access to the cutting blades, both rotary and stationary, such as for purposes of sharpening or replacement. Also, a foreign object may be conveniently removed from the cutting chamber. Such an arrangement adds to the practicality and convenience of the apparatus.

The cutting chamber and the screen holders are enclosed by a shroud 173 which forms the exterior surface of the granulating machine 90. Between the screens 117 and 119 and shroud 173 is an inner baffle 174 upon which the rubber particles fall beneath the screens. The rubber particles, once they have fallen through the screens, collect on the baffle surface where they tend to move toward a funnel-like structure 176 at the bottom of the apparatus and from there into a catch trough 174 which runs the length of the cutting chamber, beneath the lower stationary cutting block 115. The rubber particles are moved out of the catch trough 174 by a blower, and then moved to the fiber separator.

Figure 10:
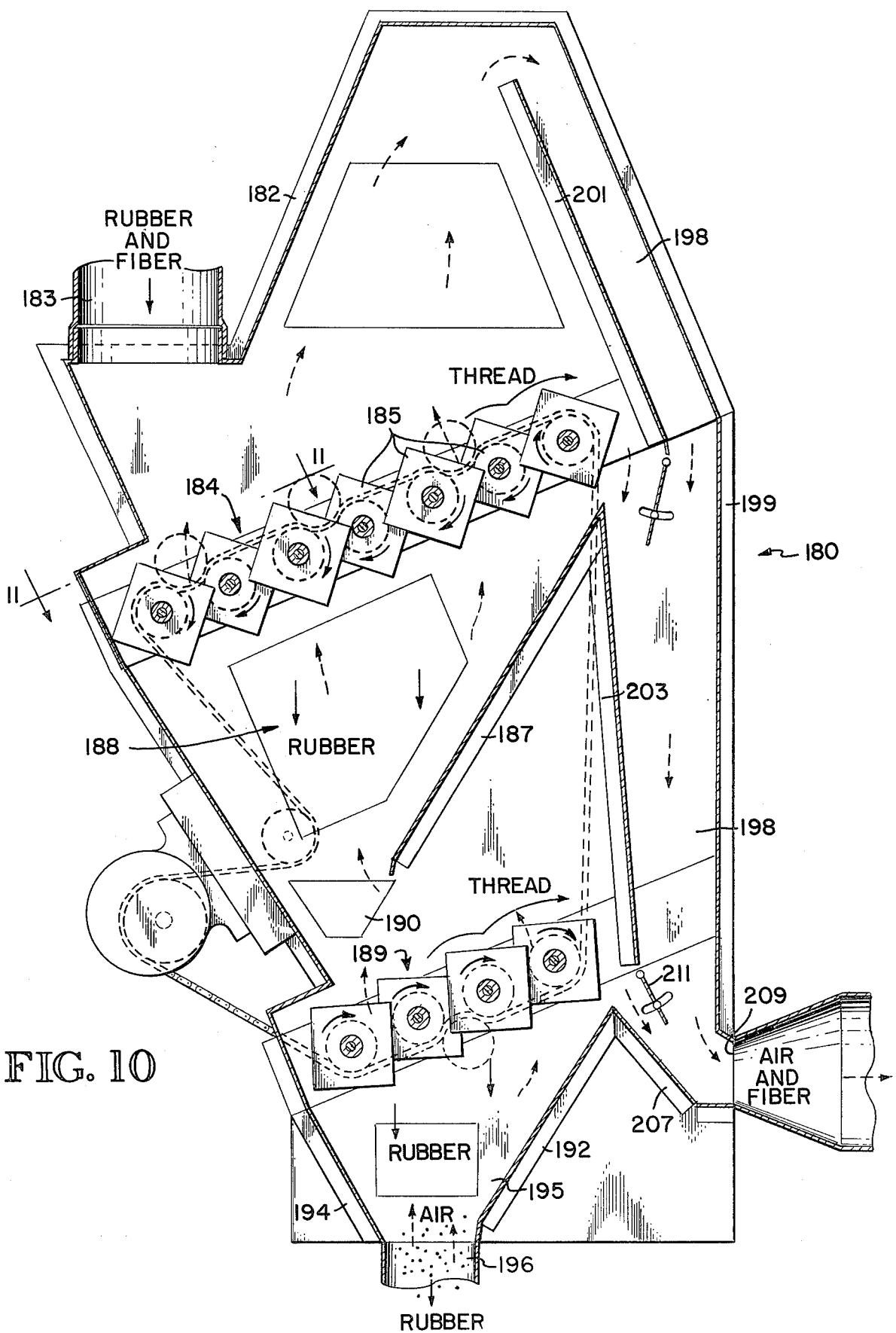
FIG. 10 is a vertical cross-section of the separating machine.

Referring specifically to FIG. 10, the fiber separator, shown generally at 180, separates rubber particles from fibrous particles, such as result from grinding the cord. In the granulator, as explained above, the debeaded rubber tires are ground to particles of fine size. However, the rubber particles are mixed in with fiber particles, which are undesirable. The separator 180 separates fiber particles from the rubber particles, so that only rubber particles appear at a given output.

The separator 180 includes an exterior shroud or cover 182 having an inlet 183 near the top thereof. The inlet 83 in the embodiment shown is circular and approximately 8 inches in diameter. Typically, the rubber and fiber particles from the granulating machine are fed into separator 180 after they have gone through a conventional cyclone dust collector. The input material, after entering through inlet 83, falls onto a first separating apparatus 184, comprising a plurality of sets of revolving plates 185. Each set of revolving plates consists of a horizontal rod 185a which runs the full width of the machine, with a plurality of vertical metal plates, each approximately 1/16th inch thick and 4 ½ inches square, mounted at ½ inch intervals therealong.

Figure 11:
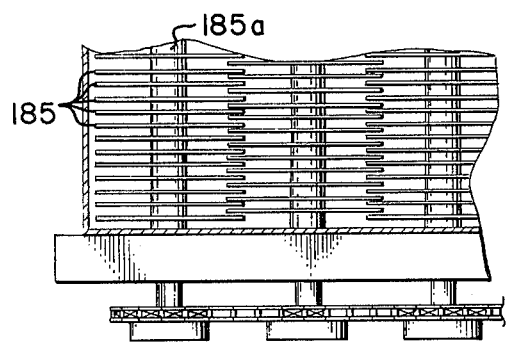
FIG. 11 is a partial cross-section of the granulating machine of FIG. 10, taken along lines 11—11 of FIG. 10.

The successive sets of revolving plates are positioned so that the plane of separating apparatus 184 extends upwardly from front to rear at an angle of approximately 20°. The plates in adjacent sets of revolving plates are interleaved and the plates themselves are spaced sufficiently close together along the individual rods that there results a rather tightly packed configuration of revolving plates over the cross-sectional area of the macine, except for an airflow channel at the rear, which is explained in more detail hereinafter. This is shown most clearly in FIG. 11. The rods and the plates mounted therealong are revolved at a relatively slow rate of approximately 90 RPM.

A baffle 187 extends downwardly from a point a few inches below the rearmost set of revolving plates, and slightly forwardly as well, forming with the sides and front of shroud 183 a funnel-shaped region 188, which culminates in a relatively narrow opening 190 which is approximately 6 inches deep, and which extends across the width of the machine.

A second separating apparatus 189, also comprising a plurality of sets of revolving plates, similar to the sets of revolving plates in the first separating apparatus, is located below opening 190. There are fewer sets of revolving plates in the second separating apparatus, however; 4 sets in the embodiment shown for the second separating apparatus as opposed to seven sets in the first separating apparatus. The individual sets of revolving plates in the second separating apparatus, however, are similar in configuration and arrangement to those in the first separating apparatus, and the plane of the sets of revolving plates in the second separating apparatus is at approximately the same angle as for the first separating apparatus.

A second baffle 192 extends downwardly from a point just beneath the rearmost set of revolving plates in the second separating apparatus, forming with the sides of the shroud and a rearwardly angling front wall 194 a funnel-shaped region 195 which ends in an opening 196 at the bottom of the machine.

At the rear of the interior of separator 180 is an airflow channel 198 which extends across the full width of the machine and also approximately the full height of the machine. The airflow channel 198 is formed by the back wall 199 of the separator and a series of baffles which are spaced inwardly a few inches from the back wall. A top baffle 201 extends the width of the machine from a point which is slightly to the rear of the last set of revolving plates in the first separator apparatus 184 to approximately the top of the cover 182, leaving a space of a few inches between the top end of the baffle 201 and the top of the cover. Beneath baffle 201 is an intermediate baffle 203, the top of which joins the top of baffle 187. Baffle 203 extends almost vertically downwardly and terminates just behind the last set of revolving plates in the second separating apparatus 189. A first damper 205 extends downwardly from the lower edge of baffle 201 to a point slightly behind and below the upper edge of baffle 203. Damper 205 is swingably connected to the lower edge of baffle 201 and there is a space between damper 205 and baffle 203.

A lower baffle 207 is located beneath intermediate baffle 203. The top of baffle 207 joins the top of baffle 192. Baffle 207 angles rearwardly and intersects the rear wall of the machine. There is an opening 209 in the rear wall 199 of the separator, and baffle 207 extends to the lower edge of the opening, completing the airflow channel. A second damper 211 extends from the lower edge of baffle 203 to a point behind and below the top edge of baffle 207, leaving a small space between damper 211 and the rear surface of baffle 207. Damper 211 swings about an axis which is adjacent to the lower edge of baffle 203.

A fan (not shown) is located in the pipe leading away from opening 209. When the fan is operating, air is drawn upwardly into the separator through bottom opening 196, upwardly in sequence through the second funnel-shaped region 195, the second separating apparatus 189, the first funnel-shaped region 188, the first separating apparatus 184, up into the region between the front wall of the separator above the inlet opening and the front surface of upper baffle 201. The air then moves around the top of baffle 201 and then down through the airflow channel 198 formed by the rear wall of the separator and the back surfaces of baffles 201, 203 and 207 and then out the rear opening 209.

In operation, the combined rubber/fiber particles are fed into the separator through inlet 183 and tend to fall down toward the first separating apparatus 184. With the fan on, a flow of air moves up from bottom opening 196 through the first and second separating apparatuses, tending to lift the fiber particles up along with the airflow, while the rubber particles, being heavier, tend to fall through the separating apparatuses. Clumps of fibers tend to move through either the first or second dampers directly into the airflow channel. Thus, separation of the fibers from the rubber particles is assured. The output at the bottom of the machine, through opening 196, is substantially only rubber particles, the desired end product of the apparatus.

Figure 12:
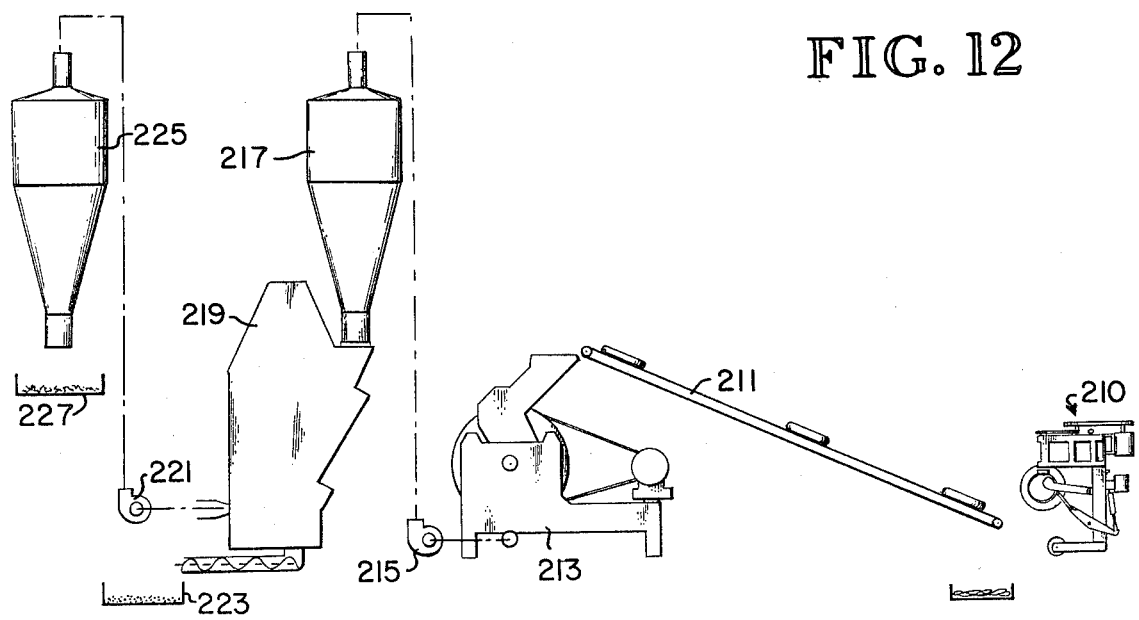
FIG. 12 is a pictorial view showing the interrelationship of the machines of FIGS. 1, 6 and 10.

FIG. 12 shows a pictorial view of a system which incorporates all of the machines described in detail above. The debeading machine 210 removes the beads from tires. The debeaded tires are then moved by a conveyor to the granulating machine 213. A fan 215 removes the fiber and rubber particles from the granulating machine 213 and feeds the particles to a cyclone 217, which feeds the collected particles to the separator 219. A fan 221 maintains a flow of air through the separator, resulting in rubber particles exiting out one opening to a receptacle 223 and the fiber particles being fed into another cyclone 225 which collects them and deposits them in a receptacle 227.

Thus, an apparatus has been described which is capable of producing rubber granules of desired size from tires and other rubber products. In operation, the bead of the tire is quickly and reliably removed, and the tire then applied to a granulator which grinds the debeaded tire into particles of desired size. A separator then separates the fibrous material from the rubber particles. A magnetic separator may be included at the bottom of the separator to remove any metal particles in the material from the granulator. The output of the apparatus is thus substantially only rubber particles of the desired size. The apparatus shown and described is durable, and capable of producing a high volume of product, with long hours of continuous operation. It thus makes practical recovery of rubber from used tires.

Although a preferred embodiment of the invention, incorporating the best mode, has been disclosed herein for purposes of illustration, it will be understood that various changes, modifications and substitutions may be incorporated in such embodiment without departing from the spirit of the invention which is defined by the claims which follow.

I claim:

1. An apparatus for granulating rubber, comprising:
    means for feeding rubber-containing material, such as tires, into the apparatus;
    cutting chamber means which includes at least three stationary cutting blade stations located around the inner circumference of the cutting chamber means, wherein a first stationary cutting blade station is located substantially at the bottom center of the cutting chamber means, and wherein the second and third stationary cutting blade stations are located in the upper half portion of the circumference of the cutting chamber means, on opposite sides thereof, each of said stationary cutting blade stations including at least one stationary cutting blade, the cutting chamber means further including at least one set of rotary cutting blades, mounted so as to rotate within the cutting chamber means, the rotary cutting blades passing the stationary cutting blades in a cutting relationship thereto, wherein the relative spacing of the stationary cutting blade stations and the rotary cutting blades in the one set thereof is such that only one rotary cutting blade is contacting a stationary cutting blade in a cutting relationship at any one time, so as to significantly reduce the vibration of the apparatus in operation, which in turn increases the durability of and extends the life of the apparatus, said cutting chamber means further including screen means which extend between said first cutting blade station and the second and third cutting blade stations, respectively, said screen means permitting granules of desired size to fall therethrough; and means for rotating the rotary cutting blades within the cutting chamber means.

2. The apparatus of claim 1, wherein the second and third cutting stationary stations are separated by an angle of approximately 106°, while the second and third cutting stations, respectively, are separated from the first stationary cutting station by approximately 127°.

3. The apparatus of claim 1, wherein said screen means includes first and second screens which extend substantially the length of the cutting chamber means, said first and second screens being perforated to permit granules of desired size to fall therethrough.

4. The apparatus of claim 3, including means defining a groove for receiving the respective upper and lower edges of the first and second screens, and removable plate-like means positioned at spaced intervals along the surface of said first and second screens for forcing said first and second screens into said grooves and for holding said first and second screens firmly in place in said grooves in the desired configuration.

5. The apparatus of claim 4, wherein said removable plate-like means comprises a plurality of adjustable arcuate plates having innermost edges which mate against the surface of the screens, each arcuate plate comprising two sections which are pivotally connected in such a manner that, as the two sections are pivoted in one direction, pressure is brought to bear against the surface of the screen, each arcuate plate further including means for holding the two sections thereof in position relative to each other when a desired arcuate configuration of the innermost edges thereof is achieved.

6. The apparatus of claim 4, including a catch through means located beneath the first stationary cutting station, a catch surface positioned externally of said first and second screens and said, removable plate-like means upon which particles from the cutting chamber means land after falling through said screens, and associated funnel-like means connecting the lower portion of said catch surface with said catch trough, the particles from the cutting chamber means which fall through said first and second screens tending to move into the catch trough, from where they can be conveniently removed.

7. The apparatus of claim 1, wherein each of the stationary cutting stations includes two blocks of material extending lengthwise of said cutting chamber means, positioned to form a V-shaped space between them, and a plate connecting the two blocks lengthwise thereof, thereby closing off the V-shaped space lengthwise, said stationary cutting stations each including first and second stationary cutting blades secured to the respective cutting blocks so that there is a space between them, said stationary cutting blades extending slightly beyond the end surface of the blocks into the interior of the cutting chamber.

8. The apparatus of claim 7, including two end plates secured at the ends of the blocks comprising the stationary cutting stations, thus shutting off the ends of the V-shaped space between the blocks, said end plates having openings therein to permit the passage of water through the V-shaped space for cooling of the stationary cutting stations.

9. The apparatus of claim 1, including two sets of rotary cutting blades, positioned sequentially along the length of the cutting chamber, each of the rotary cutting blades in the respective sets thereof being angled such that while the entire cutting edge of each rotary cutting blade is always on the same cylindrical surface, one end of each cutting blade will be slightly offset from the other end with respect to its angular position on the cylindrical surface, the angle of the rotary cutting blades in the two sets thereof being such as to tend to force the granules toward the longitudinal center of the cutting chamber rather than the longitudinal ends thereof.

10. The apparatus of claim 9, wherein the rotary cutting blades comprising one set thereof, respectively, are offset relative to the rotary cutting blades comprising the other set thereof, so that the rotary cutting blades from the two sets thereof do not abut each other at the longitudinal center of the cutting chamber.

11. The apparatus of claim 1, wherein the apparatus includes means for mounting the rotary cutting blades, said mounting means including a plurality of substantially star-shaped plates positioned along a central drive rod, the rotary cutting blades being mounted to the respective edges of the star-shaped plates and between adjacent ones thereof.

12. The apparatus of claim 1, wherein said feeding means includes first and second lower rollers which are located substantially adjacent the cutting chamber.

13. The apparatus of claim 12, wherein said feeding means further includes an upper roller, said upper roller and said first and second lower rollers each extending substantially the entire width of the machine, the feeding means further including means for rotating the first and second lower rollers in opposite directions, toward each other.

14. The apparatus of claim 13, wherein each roller comprises a center rod and a plurality of star-shaped plates positioned at spaced intervals therealong, the plates of the upper roller tending to force a tire down between the two lower rollers, when the upper roller is rotated, the two lower rollers feeding the tire into the cutting chamber at a substantially uniform rate.

15. The apparatus of claim 1, including hopper means for temporarily storing the rubber-containing material which is to be fed into the cutting chamber means and means communicating said hopper means with said cutting chamber means, wherein the diameter of said communicating means at said cutting chamber means is relatively large compared to the diameter of said cutting chamber means.

16. An apparatus for removing the bead from a tire, comprising:

means for supporting a tire;

means for moving the supporting means, with the tire thereon, to a first operative position;

means for cutting through the sidewall of the tire, including means for moving said cutting means into a position where it makes an initial cut through at least one sidewall of the tire when said supporting means is in said first operative position; and means independent of said cutting means but responsive to said cutter moving means for permitting movement of the tire and the cutting means relative to each other after the initial cut in the sidewall has been made, so that any further cutting of the sidewall occurs closer to the bead than does the initial cut.

17. The apparatus of claim 16, wherein said cutting means includes a cutting blade and cutting blade block, located respectively on opposite sides of the tire when said supporting means is in the first operative position, wherein in operation, both sidewalls of the tire are squeezed between the cutting blade and the cutting blade block so that both beads of the tire are removed at once.

18. The apparatus of claim 17, including two horizontally pivoting arms on which are mounted, respectively, said cutting blade and said cutting blade block, said pivoting arm being positioned on opposite sides of the tire, wherein said cutter moving means includes means for moving said pivoting arms so that said cutter blade mates against said cutting blade block, thereby cutting through the sidewalls of the tire.

19. The apparatus of claim 18, wherein said cutter moving means includes a horizontal main lever supported for horizontal rotation between said two pivoting arms, and two arcuate-shaped connecting levers connecting the respective ends of the main lever with said two pivoting arms, so that rotation of said main lever in one direction results in said two pivoting arms moving toward each other while rotation of said main lever in the other direction results in said two pivoting arms moving away from each other.

20. The apparatus of claim 16, including a first arm which is secured to, and moves with, said means for moving said supporting means, and a second arm which moves in response to the cutter moving means, said first and second arms mating together in such a fashion that said second arm prevents further movement of said first arm and hence said means for moving said supporting means when said supporting means reaches the first operative position, the second arm being mounted so as to be responsive to said cutter moving means such that when said cutting means has been moved by said cutter moving means to make the initial cut, said second arm is moved sufficiently that further movement of said first arm and hence said supporting means and the tire thereon occurs.

21. The apparatus of claim 20, wherein said apparatus includes a vertical support member and wherein said means for moving said supporting means includes first and second vertically pivoting arms, one end of said first vertically pivoting arm being pivotally secured to said vertical support member, said supporting means being connected to the other end thereof, said second vertically pivoting arm being pivotally connected to said vertical support member at a point below the first vertically pivoting arm, one end of said second vertically pivoting arm being connected to an actuating means while the other end thereof is connected to the first vertically pivoting arm near the other end thereof by a connecting arm, downward movement of the one end of the second vertically pivoting arm by the actuating means resulting in an upward movement of the other end of the second vertically pivoting arm and the other end of the first vertically pivoting arm, further resulting in said supporting means being thus moved into the first operative position.

22. The apparatus of claim 20, wherein said first arm extends substantially vertically upwardly, and includes a small hook-like projection on the upper end thereof, and wherein said second arm is L-shaped, and includes means for pivoting said second arm about a horizontal axis, one end of said L-shaped arm being secured to the cutter moving means, the other end of said L-shaped arm including roller means for mating with the hook-like projection on the upper end of said first arm.

23. The apparatus of claim 20, including a stop for terminating the further movement of said first arm, said stop including means for adjusting the position of said stop and hence the amount of further movement of said first arm.

24. An apparatus for separating fiber or other relatively lightweight particles from rubber or other relatively heavy particles, comprising:
an enclosure which includes a first opening therein for input of fiber particles and rubber particles;
first means for separating the fiber particles and the rubber particles, located beneath the first opening;
second means for separating the fiber particles and the rubber particles, located beneath said first separating means;
first exit means defined in said enclosure beneath said second separating means;
means defining a first funnel-like region between the first and second separating means;
means defining a second funnel-like region between said second separating means and said first exit means;
a second exit means defined in said enclosure;
means defining a channel for movement of air within said enclosure, said air channel means extending from a point above the first separating means to said second exit means;
means providing air communication between the vicinity of said first separating means and said air channel means;
means providing for air communication between the vicinity of said second separating means and said air channel means; and
means drawing air up from said first exit means through, in sequence, said second funnel-like means, said second separating means, said first funnel-like means, said first separating means, and through said air channel means to said second exit means, wherein, in operation, the heavier rubber particles which are fed into the apparatus through said first opening drop down through the first and second separating means and out the first exit means, while the lighter fiber particles are carried with the flow of air through said air channel means out said second exit means.

25. The apparatus of claim 24, wherein each of the first and second separating means includes a plurality of support rods which extend substantially the width of the machine, each of the rods having therealong a plurality of plates positioned at close intervals, the spacing of the rods and the size of the plates being such that plates from adjacent rods closely interleave each other, the first and second separating means further including means for rotating the support rods.

26. The apparatus of claim 25, wherein said support rods in each separating means are in a plane which is at an angle relative to the horizontal.

27. The apparatus of claim 26, wherein the angles of the planes in which the first and second separating means lie are substantially the same.

28. The apparatus of claim 30, wherein said means defining the first funnel-like region includes an opening at the bottom thereof which runs substantially the width of the machine a relatively small distance above the second separating means, slightly to the rear of the most forward support rod and associated plates.

29. The apparatus of claim 28, wherein said second separating means has fewer support rods with the associated plates then the first separating means.

30. The apparatus of claim 24, wherein said means defining an air channel includes a first baffle means extending upwardly within the apparatus from the upper surface of said first separating means at the rear edge thereof, a second baffle means extending upwardly from the upper surface of the second separating means at the rear edge thereof to just below the lower surface of said first separating means, defining a first opening between said first separating means and said second baffle means, and a third baffle means extending from just below the lower surface of the second separating means to said second exit means, defining a second opening between said second separating means and said third baffle means, said first, second and third baffle means extending substantially the full width of the enclosure, said first and second openings comprising said first and second air communication means.

31. The apparatus of claim 30, wherein the enclosure defines an upper space above the first separating means and above the first opening, and wherein said first baffle means extends into the upper space to a point slightly below the top of the enclosure.

32. The apparatus of claim 30, including first and second damper means swingably connected about the lower edges of the first and second baffle means, respectively.

33. A system for producing rubber granules from tires, comprising:
means for removing the bead from a tire, which comprises, means for supporting the tire, means for moving the supporting means, with the tire thereof, to a first operative position, means for cutting through the sidewall of the tire, the cutting means including means for moving said cutting means into a position where it makes an initial cut through at least one sidewall of the tire when said supporting means is in said first operative position, and means independent of said cutting means but responsive to said cutter moving means for permitting movement of the tire and the cutting means relative to each other after the initial cut has been made, so that further cutting of the sidewall of the tire occurs closer to the bead than the initial cut;
an apparatus for granulating rubber which comprises, means for feeding the debeaded tires into the rubber granulating apparatus, cutting chamber means which includes at least three stationary cutting blade stations located around the circumference of the cutting chamber means, wherein a first stationary cutting station is located substantially at the bottom center of the cutting chamber means, and wherein the second and third stationary cutting blade stations are located in the upper portion of the circumference of the cutting chamber means, on opposite sides thereof, each of said stationary cutting blade stations including at least one stationary cutting blade, the cutting chamber means further including at least one set of rotary cutting blades, mounted so as to rotate within the cutting chamber means, the rotary cutting blades passing the stationary cutting blades in a cutting relationship thereto, said cutting chamber means further including screen means which extend between said first cutting blade station and the second and third cutting blade stations, respectively, said screen means permitting granules of desired size to fall therethrough, and means for rotating the rotary cutting blades within the cutting chamber means; and
an apparatus for separating the fiber particles from the rubber particles generated by the granulating apparatus, the separating apparatus comprising, an enclosure which includes a first opening for input of the fiber particles and the rubber particles, first means for separating the fiber particles and the rubber particles, located beneath the first opening, second means for separating the fiber particles and the rubber particles, located beneath said first separating means, first exit means defined in said enclosure beneath said second separating means, means defining a first funnel-like region between said first and second separating means, means defining a second funnel-like region between said second separating means and said first exit means, a second exit means defined in said enclosure, means defining a channel for movement of air within said enclosure, said air channel means exending from a point above the first separating means to said second exit means, and means drawing up air from said first exit means through, in sequence, said second funnel-like means, said second separating means, said first funnel-like means, said first separating means, and said air channel means, wherein, in operation, the heavier rubber particles which are fed into the apparatus through said first opening drop down through the first and second separating means and out the first exit means, while the lighter fiber particles are carried with the flow of air through the air channel means out said second exit means.

34. The system of claim 33, including fan means for removing the fiber particles and the rubber particles from said granulating means.

35. The system of claim 34, including means connecting the output of said granulating means with the first opening in the separating means, a first cyclone separator means in said connecting means, and a second cyclone separator at said second exit of the separator means for collecting the fiber particles.

36. The system of claim 33, wherein said bead removing means includes a first arm which is secured, and moves with, said means for moving said supporting means, and a second arm which moves in response to the cutter moving means, said first and second arms mating together in such a fashion that said second arm prevents further movement of said first arm and hence said means for moving said supporting means when said supporting means reaches the first operative position, the second arm being mounted so as to be responsive to said cutter moving means such that when said cutting means has been moved by said cutter moving means to make the initial cut, said second arm is moved sufficiently that further movement of said first arm and hence said supporting means and the tire thereon occurs.

37. The system of claim 36, including two horizontally pivoting arms on which are mounted, respectively, a cutting blade and a cutting blade block, said pivoting arms being positioned on opposite sides of the tire, wherein said cutter moving means includes means for moving said pivoting arms so that said cutter blade mates against the cutting blade block, thereby cutting through the sidewalls of the tire, said cutter moving means further including a horizontal main lever support for horizontal rotation between said two pivoting arms, and two arcuate-shaped connecting levers connecting the respective ends of the main lever with said two pivoting arms, so that rotation of said main lever in one direction results in said two pivoting arms moving toward each other while rotation of said main lever in the other directions results in said two pivoting arms moving away from each other.

38. The system of claim 33, wherein said stationary cutting blade stations include means for receiving the respective upper and lower edges of the screen means, and removable means for holding said first and second screens in place against the stationary cutting blade stations in the desired configuration, wherein said removable screen holding means includes a plurality of adjustable arcuate plates, the innermost edges of the adjustable plates mating against the surface of the screens, each arcuate plate comprising two sections which are pivotally connected in such a manner that the innermost edges of the two sections together assume a desired arcuate configuration, each arcuate plate further including means for holding the two sections thereof in position relative to each other when a desired arcuate configuration of the innermost edges thereof is achieved.

39. The system of claim 33, wherein each of the stationary cutting blade stations includes two blocks of material extending lengthwise of said cutting chamber means, positioned to form a V-shaped space between them, and a plate connecting the two blocks lengthwise thereof, thereby closing off the V-shaped space lengthwise, said stationary cutting stations each including first and second stationary cutting blades secured to the respective cutting blocks, so that there is a space between then, said stationary cutting blades extending slightly beyond the end surface of the blocks into the interior of the cutting chamber.

40. The system of claim 39, including two end plates secured at the ends of the blocks comprising the stationary cutting stations, thus shutting off the ends of the V-shaped space between the blocks, said end plates having openings therein to permit the passage of water through the V-shaped space for cooling of the stationary cutting stations.

41. The system of claim 33, wherein said first separating means extends farther rearwardly of the apparatus than said second separating means.

42. The system of claim 33, wherein said means defining an air channel includes a first baffle means extending upwardly within the apparatus from the upper surface of said first separating means at the rear edge thereof, a second baffle means extending upwardly from the upper surface of the second separating means at the rear edge thereof to just below the lower surface of said first separating means, and a third baffle means extending from the lower surface of the second separating means to said second exit means, said first, second and third baffle means extending substantially the full width of the enclosure.

43. The system of claim 42, including first and second damper means swingably connected about the lower edges of the first and second baffle means, respectively.

* * * * *